April 9, 1968               C. PRESS             3,376,956
HYDRAULIC DISC BRAKE WITH MANUAL ACTUATION DEVICE
AND WEAR COMPENSATING MEANS
Filed June 22, 1966

United States Patent Office 3,376,956
Patented Apr. 9, 1968

3,376,956
HYDRAULIC DISC BRAKE WITH MANUAL ACTUATION DEVICE AND WEAR COMPENSATING MEANS
Carl Press, Wunsiedel, Germany, assignor to Dunlop Rubber Company Limited, London, and Fort Dunlop, Erdington, Birmingham, England, a corporation of Great Britain
Filed June 22, 1966, Ser. No. 559,496
Claims priority, application Germany, July 23, 1965, T 29,049
8 Claims. (Cl. 188—73)

ABSTRACT OF THE DISCLOSURE

This invention pertains to an automatic adjuster, which is made up of two-threaded members, which are separable to effect the adjustment, one of the threaded members being rotatable by a pivoted lever having a pawl and ratchet connection with the one-threaded member, with the lever caused to pivot to produce an adjustment when engaged by a link that is carried by the two-threaded members. There is a lost motion between the link and the lever which corresponds to the clearance maintained within the brake.

---

This invention relates to adjustment devices for hydraulically or mechanically operated brakes.

One object of the invention is to provide an improved adjustment device for hydraulically or mechanically operated brakes particularly disc brakes.

According to one aspect of the invention, an adjustment device, for a brake incorporating a friction element carried on a nonrotatable component of the brake, a rotatable brake member, a thrust member operatively associated with the friction element to move the friction element into engagement with the brake member, and an actuating mechanism for moving the thrust member, comprises a first screw-threaded adjustment member non-rotatably secured to the thrust member, a second screw-threaded adjustment member in screw-threaded engagement with the first adjustment member and having ratchet teeth, a pawl engageable with the ratchet teeth of the second adjustment member and pivotally mounted on the non-rotatable component of the brake, and a link member attached to the first adjustment member and engageable with the pawl following excessive movement of the adjustment members in a brake application to cause the pawl to be re-positioned behind a fresh tooth of the ratchet and to cause the pawl to turn the ratchet on release of the brake to increase the effective length of the adjustment device.

According to another aspect of the invention, a disc brake incorporates a friction element carried on a non-rotatable component of the brake, a rotatable brake disc, a thrust member operatively associated with the friction element to move the friction element into engagement with the brake disc, a piston and cylinder assembly in which the piston is operatively associated with the thrust member, and an adjustment device, the adjustment device comprising a first screw-threaded adjustment member nonrotatably secured to the piston, a second screw-threaded adjustment member in screw-threaded engagement with the first adjustment member and having ratchet teeth, a pawl engageable with the ratchet teeth of the second adjustment member and pivotally mounted on the cylinder, and a link member attached to the first adjustment member and engageable with the pawl following excessive movement of the adjustment member in a brake application to cause the pawl to be repositioned behind a fresh tooth of the ratchet and to cause the pawl to turn the ratchet relative to the first adjustment member on release of the brake to increase the effective length of the adjustment device.

Mechanical and hydraulic actuation may be provided for disc brakes having adjustment devices according to the present invention. Such brakes may be provided with actuating levers which move either axially or radially with respect to the disc. Operation by an axially movable actuating lever may be achieved by interposing, for example, a sliding spring-loaded sleeve in the cylinder housing between the second adjustment member and the actuating lever, to transmit the braking force. If operation by a lever which is movable in a plane parallel to that of the disc is desired, then a ball and ramp expander device may be used. The expander device may be mounted either between the piston and the friction element, in which case adjustment (which requires movement of the adjustment members relative to the pawl) occurs only during hydraulic operation, or it may be mounted on the other side of the second adjustment member.

Two embodiments of the invention will now be described, by way of example, with reference to the accompanying drawings in which.

Figure 1:
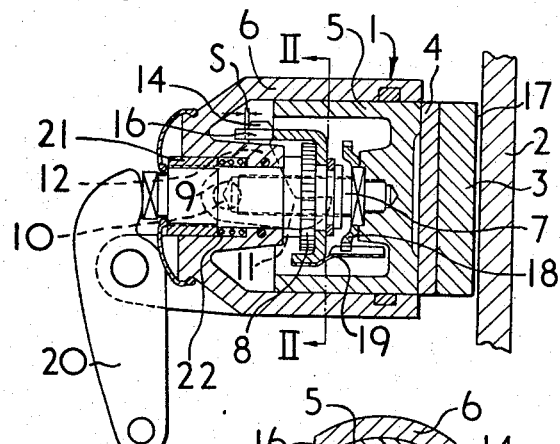
FIGURE 1 is a cross-sectional view of part of a disc brake incorporating an adjustment device according to the present invention.

In the drawings, a disc brake 1 comprises a rotatable disc 2 and a friction pad 3 supported adjacent the disc by a nonrotatable component (not shown) for movement into frictional engagement with the disc on operation of the brake.

The friction pad 3 is mounted on a backing plate 4 to form a friction element which is connected to a thrust member in the form of a piston 5 sliding in a hydraulic cylinder 6, the piston 5 and cylinder 6 forming a hydraulic actuating mechanism for the brake.

A second friction pad (not shown), axially opposite the pad 3 on the other side of the disc, is arranged to make a corresponding movement into frictional engagement with the disc on operation of the brake. In one such arrangement, the second friction pad may be mounted on a backing plate fixed to a rigid caliper extending over a portion of the periphery of the disc, the caliper being rigidly attached to the cylinder 6.

Compensation for wear of the friction pad 3 is provided by an adjustment device according to the invention, the device comprising a first screw-threaded adjustment member in the form of a bolt 7 non-rotatably secured to the piston 5, a second screw-threaded adjustment member in the form of a ratchet wheel 8 in screw-threaded engagement with the bolt 7. A pawl 9, pivoted on a pin 10 fixed to the cylinder 6, has two limbs 11 and 12 in substantially an L-shaped configuration, the limbs 11 and 12 having respectively a claw 13 for engagement with the ratchet teeth of the wheel 8, and projection 14 by which a pivoting force can be applied to the pawl. A link member 15 is attached to the bolt 7 and is provided with a slot 16 into which extends the projection 14 on the limbs 12 of the pawl, the length of the slot 16 being such that the projection on the pawl has a predetermined amount of play S (see FIGURE 1) within the slot in a direction parallel to the axis of the cylinder 6. The amount of play S is determined by the width of the air gap 17 required between the friction element 3 and the disc 2.

To prevent the piston 5 from rotating during operation of the brake, and with it the bolt 7, the piston is provided with a toothed disc member 18 the teeth of which are engaged by a locking spring 19 attached to the link member 15.

Figure 2:
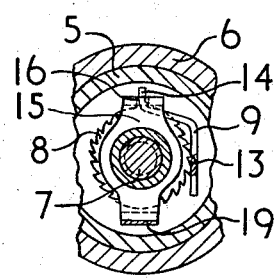
FIGURE 2 is a cut-away view of part of the disc brake shown in FIGURE 1, taken on the line II—II.

The embodiment of this invention shown in FIGURES 1 and 2 has an axially movable mechanical actuating lever 20 mounted on the cylinder 6. On operation of the brake the actuating lever 20 applies a thrust to the rear end of the ratchet wheel 8 through a sleeve 21 which is slidably mounted in the cylinder 6 and provided with a return spring 22. The thrust is transmitted directly to the friction pad 3.

Figure 3:
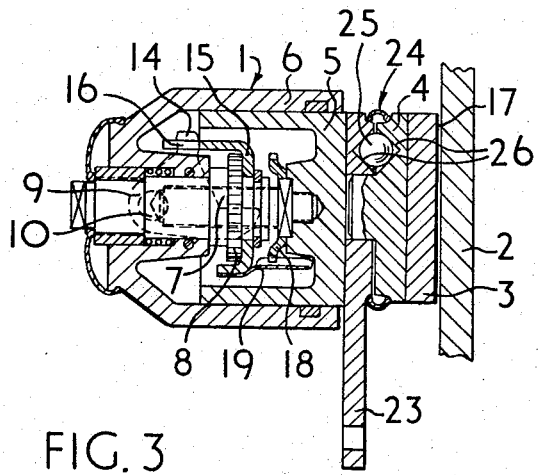
FIGURE 3 is a similar view to that of FIGURE 1, showing an alternative disc brake having an actuating lever connected to a ball and ramp expander mechanism mounted between the piston and the friction element.

FIGURE 3 shows an embodiment of this invention having a mechanical actuating lever 23 movable in a plane parallel to that of the disc 2 and operating a ball and ramp expander device 24 positioned between the piston 5 and the friction element. Movement of the lever 23 causes balls 25 to run up opposed ramps 26 formed in the lever 23 and the backing plate 4 forcing the backing plate 4 and the lever 23 apart to move the friction element 3 into engagement with the disc.

The adjustment device shown in FIGURES 1-3 functions in the following way. When movement of the piston 5 within the cylinder 6 occurs, the link member 15 engages the projection 14 on the pawl after the gap S has been taken up. Further movement of the piston and with it the link member causes the pawl to pivot on its pin 10, and its claw 13 to move from engagement with one ratchet tooth of the wheel 8 towards the next tooth. If sufficient wear of the friction element has occured, the movement of the piston during the brake application will be enough to allow the claw to slide over the next tooth.

On retraction of the friction element after the brake application, movement of the piston by the amount S occurs before the link member 15 re-engages the projection 14 on the pawl, then the remainder of the retraction movement causes the link member to pivot the pawl, and the claw 13 to engage the tooth on the ratchet wheel 8 which it has just slid over, and cause the ratchet wheel 8 to rotate with respect to the bolt 7, thereby increasing the distance between the piston and the ratchet wheel 8 and taking up the wear which has occurred to the friction pad.

From this it will be seen that whatever form of brake actuation is used, adjustment occurs whenever the piston (and therefore the link member) moves more than a predetermined distance from its retracted positions. Consequently, in the embodiment shown in FIGURE 3 of the drawings, adjustment occurs only during hydraulic actuation of the brake, because mechanical actuation in this case causes no movement of the piston.

If a brake operable by a lever moving in a plane parallel to that of the disc is required to have adjustment during mechanical operation, then the ball and ramp expander mechanism of FIGURE 3 can be mounted in any convenient position behind the piston in order to transmit its brake-applying force through the piston.

Although the present invention has been illustrated and described in connection with certain selected example embodiments, it will be understood that these are illustrative of the invention and are by no means restrictive thereof. It is reasonably to be expected that those skilled in this art can make numerous revisions and adaptions of the invention and it is intended that such revisions and adaptions will be included with the scope of the following claims as equivalents of the invention.

Having now described my invention, what I claim is:

1. In a brake incorporating a friction element carried on a nonrotatable component of the brake, a rotatable brake member, a thrust member operatively associated with the friction element to move the friction element into engagement with the brake member, and an actuating mechanism including a piston and lever, said lever acting through said piston and thrust member to apply said friction element by moving the thrust member, an adjustment device comprising a first screw-threaded adjustment member nonrotatably secured to the thrust member, a second screw-threaded adjustment member in screw-threaded engagement with the first adjustment member and having ratchet teeth, a pawl engageable with the ratchet teeth of the second adjustment member and pivotally mounted on the nonrotatable component of the brake, and a link member attached to the first adjustment member having a lost motion clearance connection adapted after predetermined movement to be engageable with the pawl following movement of the adjustment members in a brake application corresponding to the clearance intended to be maintained in said brake, to cause the pawl to be re-positioned behind a fresh tooth of the ratchet and to cause the pawl to turn the ratchet on release of the brake to increase the effective length of the adjustment device and successively position said piston to new adjusted positions in accordance with the degree of friction element wear.

2. A disc brake incorporating a friction element carried on a nonrotatable component of the brake, a rotatable brake disc, a piston and cylinder assembly in which the piston is operatively associated with the friction element, and an adjustment advice, the adjustment device comprising a first screw-threaded adjustment member nonrotatably secured to the piston, a second screw-threaded adjustment in screw-threaded engagement with the first adjustment member and having ratchet teeth, a pawl engageable with the ratchet teeth of the second adjustment member and pivotally mounted on the cylinder, and a link member attached to the first adjustment member and engageable with the pawl following excessive movement of the adjustment member in a brake application to cause the pawl to be re-positioned behind a fresh tooth of the ratchet and to cause the pawl to turn the ratchet relative to the first adjustment member on release of the brake to increase the effective length of the adjustment device.

3. A disc brake according to claim 2 in which the pawl comprises two limbs in substantally an L-shaped configuration one of the limbs having a claw for engagement with the ratchet teeth of the second adjustment member and the other having a projection for engagement with the link member.

4. A disc brake according to the claim 2 in which the link member is mounted on the first adjustment member and has an axially-extending portion defining a slot having closed ends and into which extends the projection on one limb of the pawl, the slot being longer in a direction parallel to the axis of the brake cylinder than the projection oin the pawl by an amount corresponding to the air gap required between the nonrotatable friction element and the brake disc.

5. A disc brake according to claim 2 in which the piston is provided with a toothed disc member, the teeth of which are engaged by a locking spring attached to the link member.

6. A disc brake according to claim 2 having an actuating lever which moves to operate the brake in a plane at right angles to that of the disc, the adjustment device forming an essential part of the mechanical connection between the actuating lever and the friction element.

7. A disc brake according to claim 2 having an actuating lever which moves in a plane parallel to that of the disc to operate the brake, the actuating lever being operatively associated with a ball and ramp expander mechanism which moves the friction element into engagement with the disc.

8. A disc brake according to claim 7 in which the ball and ramp expander mechanism is positioned between the piston and the friction element.

References Cited

UNITED STATES PATENTS

| | | | |
|---|---|---|---|
| 2,669,327 | 2/1954 | Chamberlain et al. | 188—72 |
| 3,158,234 | 11/1964 | Henderson | 188—72 X |
| 3,216,534 | 11/1965 | Chouings et al. | 188—79.5 |

MILTON BUCHLER, *Primary Examiner.*

G. E. HALVOSA, *Assistant Examiner.*